United States Patent
Aguilar, Jr. et al.

(10) Patent No.: US 7,240,137 B2
(45) Date of Patent: Jul. 3, 2007

(54) SYSTEM AND METHOD FOR MESSAGE DELIVERY ACROSS A PLURALITY OF PROCESSORS

(75) Inventors: Maximino Aguilar, Jr., Austin, TX (US); Michael Norman Day, Round Rock, TX (US); Mark Richard Nutter, Austin, TX (US); James Michael Stafford, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 10/926,592

(22) Filed: Aug. 26, 2004

(65) Prior Publication Data

US 2006/0047875 A1 Mar. 2, 2006

(51) Int. Cl.
*G06F 13/32* (2006.01)
*G06F 13/24* (2006.01)

(52) U.S. Cl. .................... 710/269; 710/260; 710/262
(58) Field of Classification Search ............... 710/260, 710/269, 262
See application file for complete search history.

(56) References Cited

U.S. PATENT DOCUMENTS

| | | | | |
|---|---|---|---|---|
| 5,148,544 A * | 9/1992 | Cutler et al. | ............... | 710/261 |
| 5,428,799 A * | 6/1995 | Woods et al. | ............... | 710/266 |
| 5,619,706 A * | 4/1997 | Young | .................. | 710/268 |
| 5,778,236 A * | 7/1998 | Gephardt et al. | ......... | 710/266 |
| 6,032,179 A * | 2/2000 | Osborne | .................... | 709/213 |
| 6,202,104 B1 * | 3/2001 | Ober | ......................... | 710/18 |
| 6,237,058 B1 * | 5/2001 | Nakagawa | ................. | 710/260 |
| 6,526,491 B2 | 2/2003 | Yamazaki et al. | .......... | 711/164 |
| 6,559,854 B2 | 5/2003 | Oka et al. | ................... | 345/619 |
| 6,633,940 B1 * | 10/2003 | Alasti et al. | ............... | 710/262 |
| 6,711,643 B2 * | 3/2004 | Park et al. | ................... | 710/260 |
| 6,952,749 B2 * | 10/2005 | Kim | .......................... | 710/260 |
| 6,968,411 B2 * | 11/2005 | Gaur et al. | .................. | 710/260 |
| 7,028,229 B2 * | 4/2006 | McGuire et al. | .............. | 714/57 |
| 7,039,740 B2 * | 5/2006 | Glasco et al. | .............. | 710/266 |
| 2001/0002130 A1 | 5/2001 | Suzuoki | ...................... | 345/420 |
| 2002/0046229 A1 | 4/2002 | Yutaka et al. | ............... | 709/102 |
| 2002/0060690 A1 | 5/2002 | Tanaka et al. | .............. | 345/619 |
| 2002/0095523 A1 | 7/2002 | Shimakawa et al. | ........ | 709/316 |
| 2002/0135582 A1 | 9/2002 | Suzuoki et al. | ............. | 345/502 |
| 2002/0138637 A1 | 9/2002 | Suzuoki et al. | ............. | 709/230 |
| 2002/0138701 A1 | 9/2002 | Suzuoki et al. | ............. | 711/154 |
| 2002/0138707 A1 | 9/2002 | Suzuoki et al. | ............. | 711/163 |
| 2002/0156993 A1 | 10/2002 | Suzuoki et al. | ................ | 712/30 |
| 2003/0055984 A1 | 3/2003 | Shimakawa et al. | ........ | 709/316 |
| 2005/0015764 A1 * | 1/2005 | Gaur | .......................... | 718/100 |
| 2005/0066080 A1 * | 3/2005 | Duckman | .................... | 710/52 |
| 2005/0125582 A1 * | 6/2005 | Tu et al. | ..................... | 710/260 |
| 2005/0216895 A1 * | 9/2005 | Tran | .......................... | 717/127 |

* cited by examiner

*Primary Examiner*—Mark H. Rinehart
*Assistant Examiner*—Chrristopher Daley
(74) *Attorney, Agent, or Firm*—VanLeeuwen & VanLeeuwen; D'Ann N. Rifai

(57) ABSTRACT

A system and method is provided to deliver messages to processors operating in a multi-processing environment. In a multi-processor environment, interrupts are managed by storing events in a queue that correspond to a particular support processor. A main processor decodes an interrupt and determines which support processor generated the interrupt. The main processor then determines whether a kernel or an application should process the interrupt. Interrupts such as page faults, segment faults, and alignment errors are handled by the kernel, while "informational" signals, such as stop and signal requests, halt requests, mailbox requests, and DMC tag complete requests are handled by the application. In addition, multiple identical events are maintained, and event data may be included in the interrupt using the invention described herein.

20 Claims, 7 Drawing Sheets

SYSTEM AND METHOD FOR MESSAGE DELIVERY ACROSS A PLURALITY OF PROCESSORS

BACKGROUND OF THE INVENTION

1. Technical Field

The present invention relates in general to a system and method for message delivery across a plurality of processors. More particularly, the present invention relates to a system and method for using ring queues to manage interrupt requests that are received from the plurality of processors.

2. Description of the Related Art

Computer systems are becoming more and more complex. The computer industry typically doubles the performance of a computer system every 18 months (e.g. personal computer, PDA, gaming console). In order for the computer industry to accomplish this task, the semiconductor industry produces integrated circuits that double in performance every 18 months. A computer system uses integrated circuits for particular functions based upon the integrated circuits' architecture. Two fundamental architectures are 1) microprocessor-based and 2) digital signal processor-based.

An integrated circuit with a microprocessor-based architecture is typically used to handle control operations whereas an integrated circuit with a digital signal processor-based architecture is typically designed to handle signal-processing manipulations (i.e. mathematical operations). As technology evolves, the computer industry and the semiconductor industry realize the importance of using both architectures, or processor types, in a computer system design.

The computer industry is moving towards a multi-processor architecture which includes a main processor to execute a main operating system, and one or more support processors to support application tasks. The main processor typically executes a main operating system, and invokes application programs. In turn, the application programs use the support processors for offloading particular tasks. A challenge found in multi-processor architectures, however, is managing interrupts that are received from the support processors. The amount of interrupts that occur in a computer system increases linearly as the number of processors increase. For example, if a computer system includes one main processor and eight support processors, the amount of interrupts that the processors generate may be eight times more than a computer system that includes only one processor.

Another challenge found with multi-processor interrupt management is the ability to track interrupt sequence. For example, an application may use four support processors for task execution, and each of the support processors send interrupts to the main processor. In this example, if the main processor does not manage the order in which the interrupts were received, the application may process the interrupts out of order and, in turn, generate erroneous results.

In addition, a challenge found with existing art is that if a main processor receives multiple identical event interrupts, the main processor typically combines the multiple identical event interrupts into one interrupt. This causes problems if, for example, four support processors each send an identical interrupt, and each of the identical interrupts is combined into a single interrupt.

Furthermore, a challenge found with existing art is that interrupts that are received from support processors include little or no data. This approach may force an application to spend time retrieving data from memory in order to process the corresponding interrupt.

What is needed, therefore, is a system and method to effectively manage interrupt requests in a multi-processor environment while minimizing interrupt processing load.

SUMMARY

It has been discovered that the aforementioned challenges are resolved by allocating a ring queue for each application that a processor invokes, and sequentially storing interrupts that are received from the application's support processors in the application's corresponding ring queue. A main processor decodes an interrupt and identifies the interrupt's origin and its "processor type." The interrupt's processor type informs the main processor as to whether a kernel or a corresponding application should process the interrupt. Interrupts that should be processed by the application are stored in a corresponding ring queue in the order in which they are received, regardless of whether the application is active at the time. In turn, the application accesses its ring queue and processes the interrupts.

A main processor invokes an application, and assigns a plurality of support processors to the application. For example, the application may be a gaming application that uses support processors to render terrain data. During execution, the application sends tasks to the particular support processors. Using the example described above, the tasks may include a request for each of the support processors to render terrain data for a particular portion of a computer screen.

While performing a task, one of the support processors sends an interrupt to the main processor. The main processor receives the interrupt and extracts an "interrupt type" field from the interrupt in order to determine whether the interrupt should be processed by the kernel or by the application. Interrupts such as page faults, segment faults, and alignment errors are handled by the kernel, while "informational" interrupts, such as stop and signal requests, halt requests, mailbox requests, and DMC tag complete requests are handled by the application.

If the kernel should process the interrupt, the main processor passes the interrupt to the kernel to process. On the other hand, if the application should handle the interrupt, the main processor identifies a ring queue that corresponds to the application, identifies a next available ring queue slot, and stores the interrupt in the identified ring queue slot. Multiple identical interrupts are maintained such that if a support processor sends a second interrupt that is identical to the first interrupt, the main processor stores the second interrupt in a next available slot that is separate from the slot that the main processor stored the first interrupt.

In addition, the main processor allocates a ring queue for each application, whereby each ring queue accepts interrupts regardless of the state of its corresponding application. For example, the main processor allocates five ring queues when the main processor invokes five applications. In this example, the main processor receives an interrupt and stores the interrupt in the ring queue that corresponds to the interrupt's particular application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
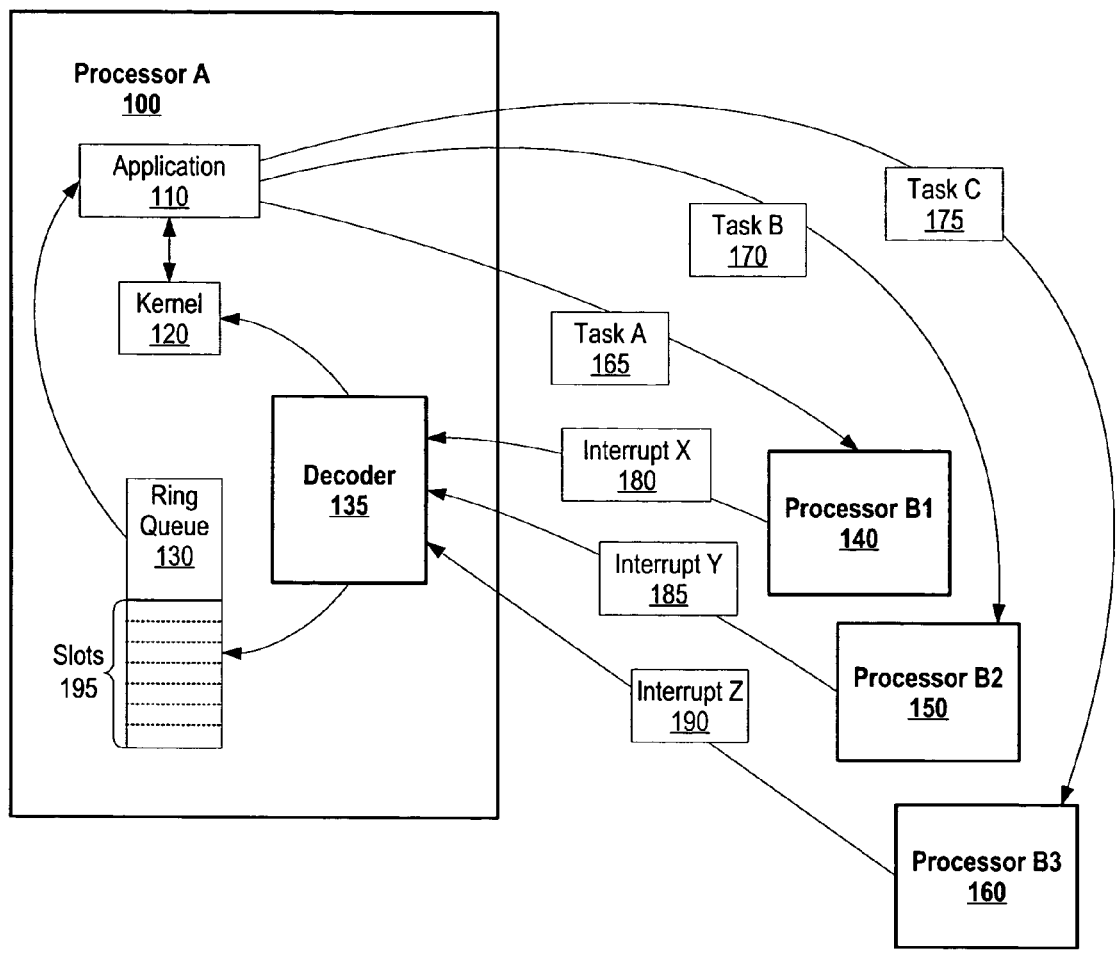
FIG. 1 is a diagram showing an interrupt decoder receiving interrupt events from a plurality of support processors, and passing the interrupts to either a kernel or a ring queue.

FIG. 1 is a diagram showing an interrupt decoder receiving interrupt events from a plurality of support processors, and passing the interrupts to either a kernel or a ring queue. In a multi-processor environment, interrupts are managed by storing the interrupts in a ring queue that corresponds to a particular application. A main processor, such as processor A 100, uses decoder 135 to decode each interrupt in order to identify which support processor sent the interrupt and determine whether the interrupt should be processed by kernel 120 or by the application itself. Interrupts such as page faults, segment faults, and alignment errors are handled by the kernel, while "informational" interrupts, such as stop and signal requests, halt requests, mailbox requests, and DMC tag complete requests are handled by the application. If the interrupt should be processed by the application, decoder 135 stores the interrupt in the application's corresponding ring queue (i.e. ring queue 130) for the application to process.

Processor A 100 invokes application 110, and assigns processor B1 140, processor B2 150, and processor B3 160 to application 110. For example, application 110 may be a gaming application that uses support processors to render terrain data. During execution, application 110 sends task A 165, task B 170, and task C 175 to the support processors. Using the example described above, the tasks may include a request for each of the support processors to render terrain data for a particular portion of a computer screen. Processor B1 140 begins executing task A 165, whereupon the processor sends an interrupt (i.e. interrupt X 180) to processor A 100. Interrupt X 180 may be an informational interrupt or it may be an interrupt requiring immediate attention.

Decoder 135 receives interrupt X 180 and uses interrupt X 180's "processor identifier" field to identify the processor that sent the interrupt. Next, decoder 135 analyzes an "interrupt type" field that is included in interrupt X 180 in order to determine whether the interrupt should be processed by kernel 120 or application 110 (see FIG. 2A and corresponding text for further details regarding interrupt attributes). If interrupt X 180 should be processed by kernel 120, decoder 135 passes interrupt X 180 to kernel 120 to process. On the other hand, if application 110 should handle the interrupt, decoder 135 identifies that ring queue 130 corresponds to application 110, identifies a next available ring queue slot in slots 195, and stores interrupt X 180 in the identified ring queue slot. Multiple identical events are maintained such that if processor B1 140 sends a second interrupt that is identical to interrupt X 180, decoder 135 stores the second event in a next available slot that is separate from the slot that decoder 135 stored the first interrupt.

Decoder 135 receives interrupts Y 185 and Z 190 from processors B2 150 and B3 160, respectively. In turn, decoder 135 decodes the interrupts and passes them to their respective locations (kernel 120 or queue 130) in the order in which the interrupts are received. For example, if decoder 135 receives interrupt Z 190 before interrupt Y 185, and both interrupts belong in ring queue 130, then decoder 135 stores interrupt Z 190 in a ring queue slot that is before the ring queue slot that it stores interrupt Y 185.

Processor A 100 allocates a ring queue for each application and each ring queue accepts interrupts regardless of the state of its corresponding application. For example, if processor A 100 is executing five applications, then processor A 100 allocates five ring queues whereby decoder 135 receives interrupts corresponding to the five applications. In this example, decoder 135 stores the interrupts in one of the five ring queues that correspond to the interrupt's particular application (see FIG. 2B and corresponding text for further details regarding multiple ring queues).

Figure 2A:
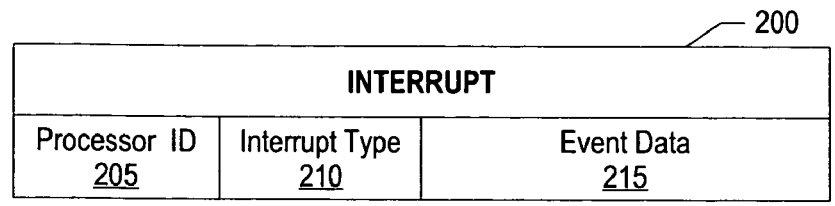
FIG. 2A is a diagram showing interrupt message properties.

FIG. 2A is a diagram showing interrupt message properties. Interrupt 200 includes three fields, which are processor identifier 205, interrupt type 210, and event data 215. A decoder uses processor identifier 205 in order to detect which processor sends an interrupt, and determines which application the identified processor supports. In turn, the decoder identifies a ring queue that corresponds to the identified application and stores the interrupt in the identified ring queue (see FIG. 4 and corresponding text for further details regarding interrupt processing).

Interrupt type 210 includes a type of interrupt which a decoder uses to determine whether to send the interrupt to a kernel or to store the interrupt in an application's corresponding ring queue. For example, interrupts such as page faults, segment faults, and alignment errors are handled by the kernel, while "informational" interrupts such as stop and signal requests, halt requests, mailbox requests, and DMC tag complete requests are handled by the application. The informational interrupts are stored in a ring queue such that a corresponding application may process the interrupts in the order in which they are received (see FIG. 5 and corresponding text for further details regarding application interrupt processing).

Event data 215 includes data that corresponds to the particular interrupt. A support processor may include data with the interrupt in order for a main processor to have immediate access to data that corresponds to the interrupt. By including event data 215 in the actual interrupt, the main processor decreases the number of interrupt processing steps and thus, handles the interrupt in a more expedient manner.

Figure 2B:
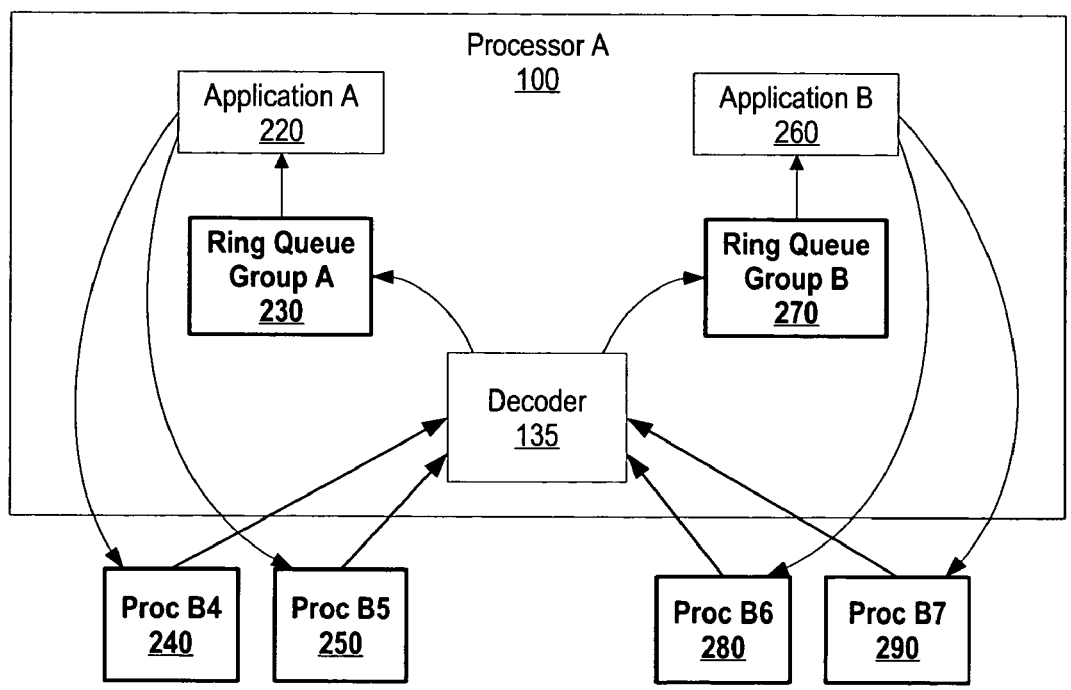
FIG. 2B is a diagram showing two separate ring queue's supporting two applications.

FIG. 2B is a diagram showing two separate ring queues supporting two separate applications. The example shown in FIG. 2B shows that processor A 100 is supporting two applications, which are application A 220 and application B 260. Both applications use support processors to offload tasks. Application A 220 uses processors B4 240 and B5 250, whereas application B 260 uses support processors B6 280 and B7 290. When processor A 100 invokes the applications, processor A 100 also allocates a ring queue for each application. The example in FIG. 2B shows that ring queue group A 230 and ring queue group B 270 are allocated to application A 220 and application B 260, respectively.

While executing tasks, the support processors send interrupts to decoder 135. Decoder 135 receives each interrupt, and uses a processor identifier that is included in each interrupt in order to identify the sending support processor. Once the support processor is identified, decoder 135 determines which application uses the support processor, and stores the interrupt in the application's corresponding ring queue. For example, decoder 135 stores interrupts that are received from processor B4 240 and B5 250 in ring queue group A 230, and decoder 135 stores interrupts that are received from processor B6 280 and B7 290 in ring queue group B 270.

Figure 3:
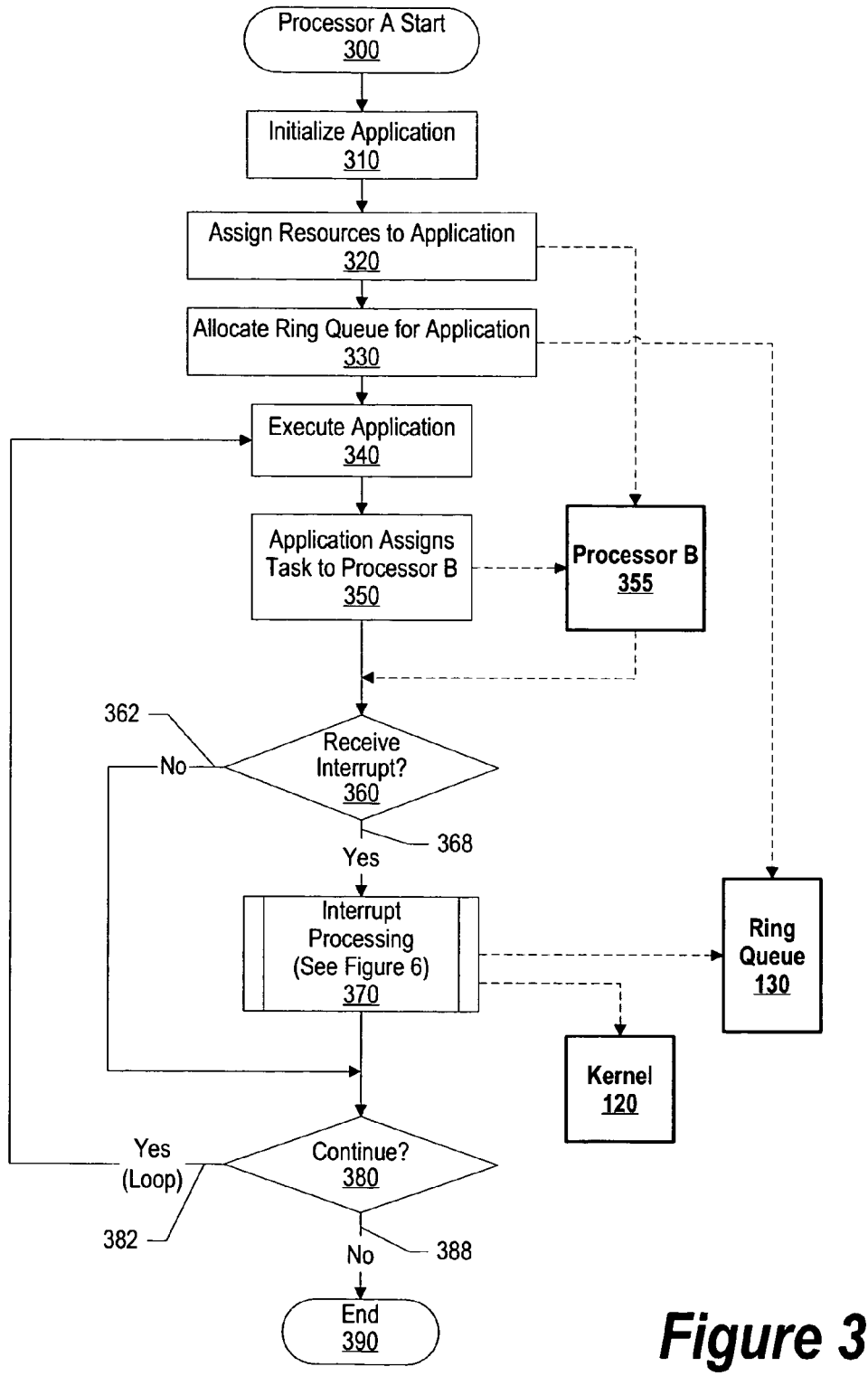
FIG. 3 is a high-level flowchart showing steps taken in a main processor executing an application and managing interrupts that are received from one or more support processors.

FIG. 3 is a high-level flowchart showing steps taken in a main processor executing an application and managing interrupts that are received from one or more support processors. Processing commences at 300, whereupon processing initializes an application at step 310. The application is an application that uses one or more support processors to offload particular tasks. For example, the application may be a terrain rendering application that uses support processors to generate terrain data for particular sections of a computer screen.

At step 320, processor A assigns resources to the application, such as processor B 355. Processor B 355 may be one of the support processors that are shown in FIG. 1, such as processor B 140 through 160. Processor A allocates ring queue 130 to the application at step 330. Processor A allocates a particular ring queue for each application such that when processor A receives an interrupt from a particular support processor, processor A detects which application should process the interrupt and, as such, processor A saves the interrupt in the application's corresponding ring queue (see FIG. 6 and corresponding text for further details regarding interrupt processing). Ring queue 130 is the same as that shown in FIG. 1.

Processor A begins executing the application at step 340. At step 350, the application assigns a task to processor B 350. For example, processor A may request processor B 355 to compute terrain data using shared memory.

A determination is made as to whether processor A receives an interrupt (decision 360). The interrupt may originate from processor B 355, or the interrupt may also originate from a support processor that supports an application that is not currently active. In addition, the interrupt may be an interrupt that should be handled by a kernel, such as a page fault, a segment fault, or an alignment error. Or, the interrupt may be an "informational" interrupt, such as a stop and signal request, a halt request, a mailbox request, or a DMC tag complete request.

Figure 6:
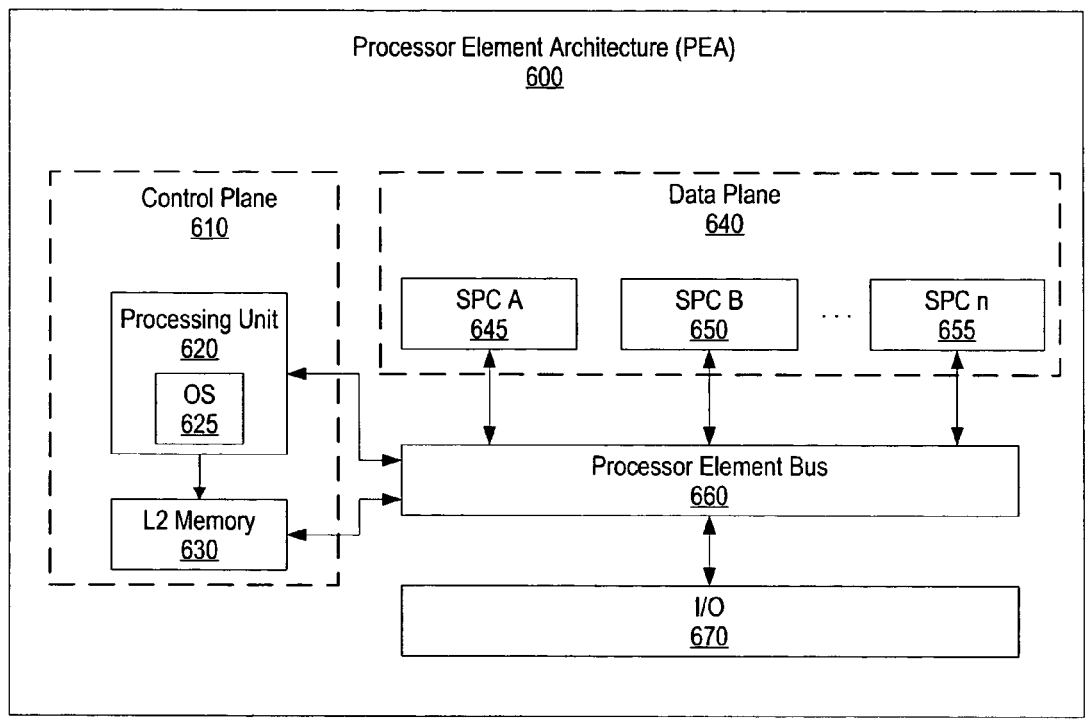
FIG. 6 is a diagram showing a processor element architecture that includes a plurality of heterogeneous processors.

If processor A received an interrupt, decision 360 branches to "Yes" branch 368 whereupon processor A handles the interrupt, and stores the event in either ring queue 130 or passes the event to kernel 120 (pre-defined process block 370, see FIG. 6 and corresponding text for further details). Kernel 120 is the same as that shown in FIG. 1. On the other hand, if processor A did not receive an interrupt, decision 360 branches to "No" branch 362 bypassing interrupt storage steps.

A determination is made as to whether processor A should continue (decision 380). If processor A should continue, decision 380 branches to "Yes" branch 382 which loops back to continue executing the application and receiving interrupts. This looping continues until processor A should terminate, at which point decision 380 branches to "No" branch 388 whereupon processing ends at 390.

Figure 4:
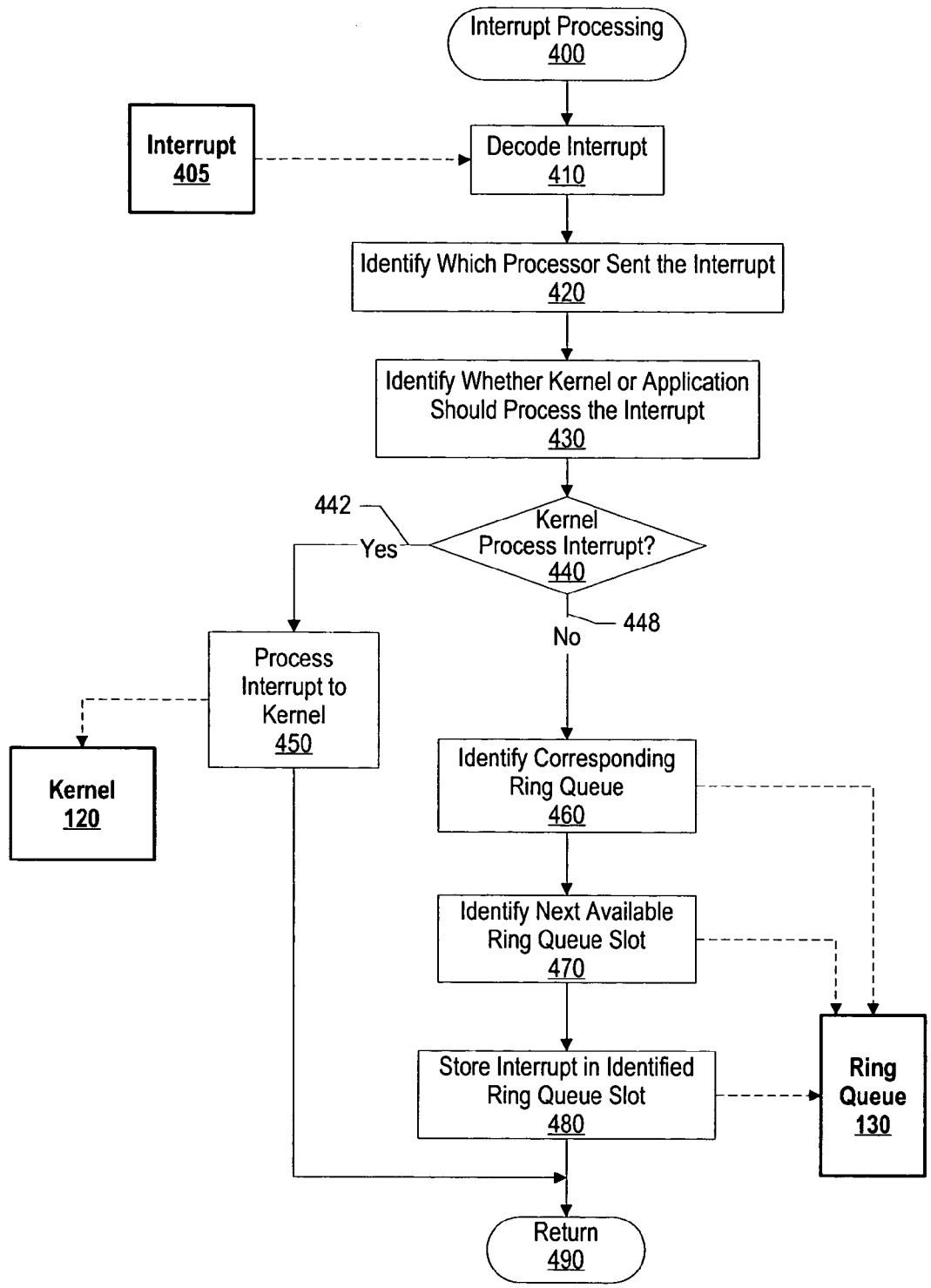
FIG. 4 is a flowchart showing steps taken in a main processor analyzing an interrupt and storing the interrupt in a corresponding ring queue.

FIG. 4 is a flowchart showing steps taken in a main processor analyzing an interrupt and storing the interrupt in a corresponding ring queue. A main processor allocates a ring queue to each executing application, and each ring queue stores interrupts for their corresponding application to process, regardless of whether the application is active (see FIG. 2B and corresponding text for further details regarding multiple ring queues).

Processing commences at 400, whereupon processing decodes interrupt 405 at step 410. Interrupt 405 includes a processor identifier, an interrupt type, and may include event data (see FIG. 2A and corresponding text for further details regarding interrupt properties). A decoder uses interrupt 405's processor identifier to identify which support processor sent the interrupt (step 420). At step 430, the decoder uses interrupt 405's interrupt type to determine whether a corresponding application or a kernel should process the interrupt. For example, interrupt types such as page faults, segment faults, and alignment errors are handled by the kernel, while "informational" interrupt types, such as stop and signal requests, halt requests, mailbox requests, and DMC tag complete requests are handled by the application.

A determination is made as to whether the kernel or the application should process the interrupt (decision 440). If the kernel should process the interrupt, decision 440 branches to "Yes" branch 442 whereupon processing passes interrupt 405 to kernel 120 (step 450) whereby kernel 120 processes the interrupt, and processing returns at 490. Kernel 120 is the same as that shown in FIG. 1.

On the other hand, if the interrupt should be handled by the corresponding application, decision 440 branches to "No" branch 448 whereupon processing identifies a ring queue that corresponds to the application (step 460). Each application uses a corresponding ring queue, and each ring queue accepts interrupts regardless of whether an application is active. The example shown in FIG. 4 shows that processing identified ring queue 130 as the ring queue that corresponds to the application. Ring queue 130 is the same as that shown in FIG. 1.

At step 470, processing identifies a next available ring queue slot in ring queue 130. Processing sequentially stores each interrupt based upon when it receives the interrupt. Processing stores the interrupt in ring queue 130 at the next available time slot for the corresponding application to process at step 480, and processing returns at 490 (see FIG. 5 and corresponding text for further details regarding interrupt processing).

Figure 5:
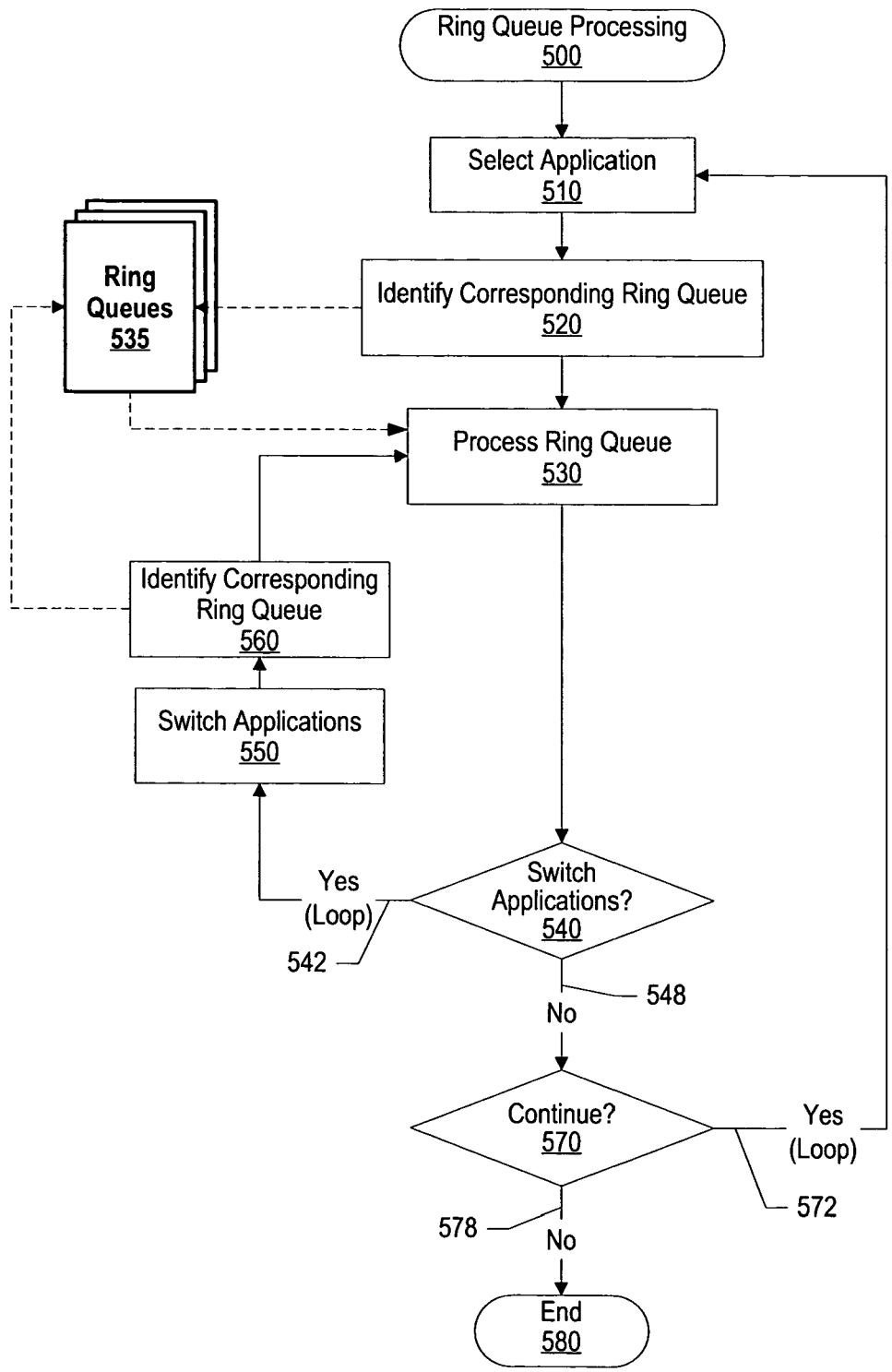
FIG. 5 is a flowchart showing steps taken in processing interrupts that are included in an application's ring queue.

FIG. 5 is a flowchart showing steps taken in processing interrupts that are included in an application's ring queue. A main processor may execute a plurality of applications, whereby each application has a corresponding ring queue that stores interrupts that the main processor receives from support processors. When appropriate, each application processes interrupts that are included in their particular ring queue.

Ring queue processing commences at 500, whereupon processing selects an application at step 510. For example, the application may be a currently active application. At step 520, processing identifies a ring queue that corresponds to the selected application from ring queues 535. The selected application processes interrupts that are included in its corresponding ring queue at step 530. For example, the corresponding ring queue may include, each from different support processors, a signal request, a halt request, a mailbox request, and a DMC tag complete request, and the application processes the interrupts in the order that the interrupts were received.

A determination is made as to whether to switch applications and process a different ring queue (decision 540). If processing should switch applications, decision 540 branches to "Yes" branch 542 whereupon processing loops back to switch applications (step 550), identify a corresponding ring queue (steep 560), and process the interrupts in the identified ring queue. This looping continues until processing should not switch applications, at which point decision 540 branches to "No" branch 548.

A determination is made as to whether to continue processing ring queues (decision 570). If processing should continue processing ring queues, decision 570 branches to "Yes" branch 572 which loops back to continue processing ring queues. This looping continues until processing should terminate, at which point decision 570 branches to "No" branch 578 whereupon processing ends at 580.

FIG. 6 is a diagram showing a processor element architecture that includes a plurality of heterogeneous processors. The heterogeneous processors share a common memory and a common bus. Processor element architecture (PEA) 600 sends and receives information to/from external devices through input output 670, and distributes the information to control plane 610 and data plane 640 using processor element bus 660. Control plane 610 manages PEA 600 and distributes work to data plane 640.

Control plane 610 includes processing unit 620 which runs operating system (OS) 625. For example, processing unit 620 may be a Power PC core that is embedded in PEA 600 and OS 625 may be a Linux operating system. Processing unit 620 manages a common memory map table for PEA 600. The memory map table corresponds to memory locations included in PEA 600, such as L2 memory 630 as well as non-private memory included in data plane 640 (see FIG. 7A, 7B, and corresponding text for further details regarding memory mapping).

Data plane 640 includes Synergistic Processing Complex's (SPC) 645, 650, and 655. Each SPC is used to process data information and each SPC may have different instruction sets. For example, PEA 600 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 645, 650, and 655 are connected to processor element bus 660 which passes information between control plane 610, data plane 640, and input/output 670. Bus 660 is an on-chip coherent multi-processor bus that passes information between I/O 670, control plane 610, and data plane 640. Input/output 670 includes flexible input-output logic which dynamically assigns interface pins to input output controllers based upon peripheral devices that are connected to PEA 600. For example, PEA 600 may be connected to two peripheral devices, such as peripheral A and peripheral B, whereby each peripheral connects to a particular number of input and output pins on PEA 600. In this example, the flexible input-output logic is configured to route PEA 600's external input and output pins that are connected to peripheral A to a first input output controller (i.e. IOC A) and route PEA 600's external input and output pins that are connected to peripheral B to a second input output controller (i.e. IOC B).

Figure 7A:
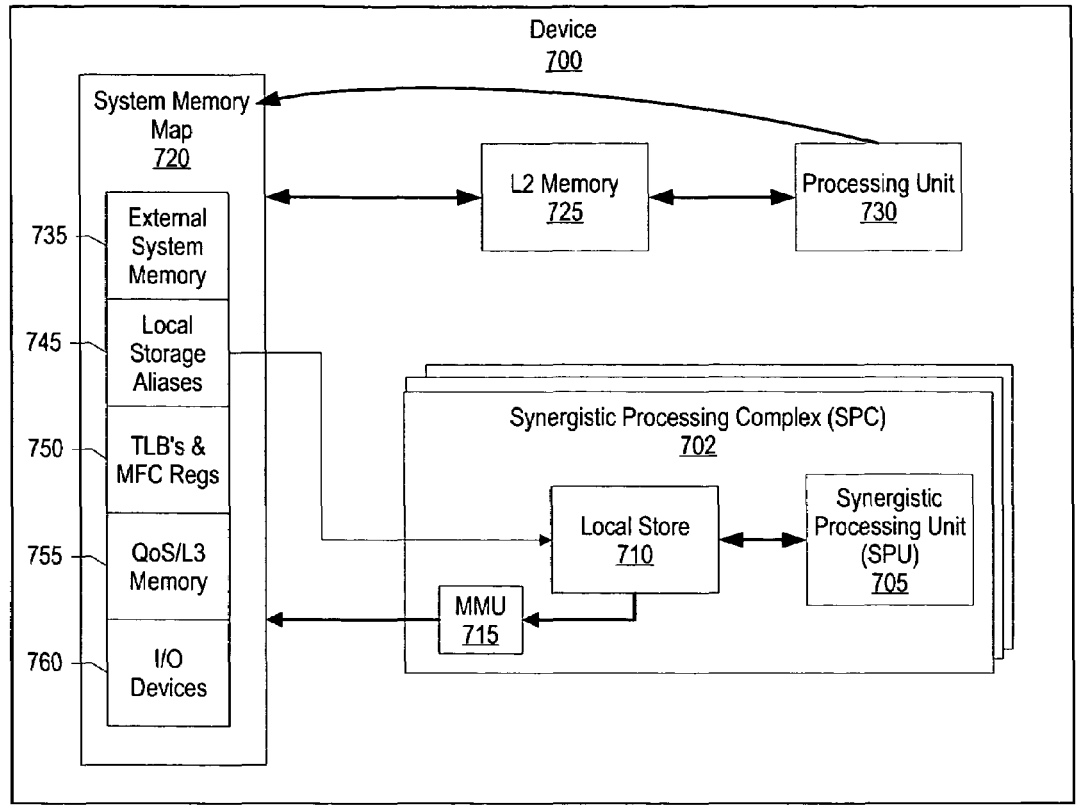
FIG. 7A illustrates an information handling system which is a simplified example of a computer system capable of performing the computing operations described herein.

FIG. 7A illustrates an information handling system which is a simplified example of a computer system capable of performing the computing operations described herein. The example in FIG. 7A shows a plurality of heterogeneous processors using a common memory map in order to share memory between the heterogeneous processors. Device 700 includes processing unit 730 which executes an operating system for device 700. Processing unit 730 is similar to processing unit 620 shown in FIG. 6. Processing unit 730 uses system memory map 720 to allocate memory space throughout device 700. For example, processing unit 730 uses system memory map 720 to identify and allocate memory areas when processing unit 730 receives a memory request. Processing unit 730 accesses L2 memory 725 for retrieving application and data information. L2 memory 725 is similar to L2 memory 630 shown in FIG. 6.

System memory map 720 separates memory mapping areas into regions which are regions 735, 745, 750, 755, and 760. Region 735 is a mapping region for external system memory which may be controlled by a separate input output device. Region 745 is a mapping region for non-private storage locations corresponding to one or more synergistic processing complexes, such as SPC 702. SPC 702 is similar to the SPC's shown in FIG. 6, such as SPC A 645. SPC 702 includes local memory, such as local store 710, whereby portions of the local memory may be allocated to the overall system memory for other processors to access. For example, 1 MB of local store 710 may be allocated to non-private storage whereby it becomes accessible by other heterogeneous processors. In this example, local storage aliases 745 manages the 1 MB of nonprivate storage located in local store 710.

Region 750 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 755 is a mapping region for the operating system and is pinned system memory with bandwidth and latency guarantees. Region 760 is a mapping region for input output devices that are external to device 700 and are defined by system and input output architectures.

Synergistic processing complex (SPC) 702 includes synergistic processing unit (SPU) 705, local store 710, and memory management unit (MMU) 715. Processing unit 730 manages SPU 705 and processes data in response to processing unit 730's direction. For example SPU 705 may be a digital signaling processing core, a microprocessor core, a micro controller core, or a combination of these cores. Local store 710 is a storage area that SPU 705 configures for a private storage area and a non-private storage area. For example, if SPU 705 requires a substantial amount of local memory, SPU 705 may allocate 100% of local store 710 to private memory. In another example, if SPU 705 requires a minimal amount of local memory, SPU 705 may allocate 10% of local store 710 to private memory and allocate the remaining 90% of local store 710 to non-private memory (see FIG. 7B and corresponding text for further details regarding local store configuration).

The portions of local store 710 that are allocated to non-private memory are managed by system memory map 720 in region 745. These non-private memory regions may be accessed by other SPU's or by processing unit 730. MMU 715 includes a direct memory access (DMA) function and passes information from local store 710 to other memory locations within device 700.

Figure 7B:
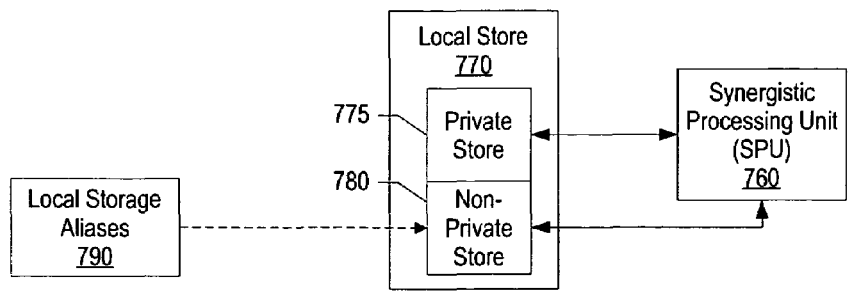
FIG. 7B is a diagram showing a local storage area divided into private memory and non-private memory.

FIG. 7B is a diagram showing a local storage area divided into private memory and non-private memory. During system boot, synergistic processing unit (SPU) 760 partitions local store 770 into two regions which are private store 775 and non-private store 780. SPU 760 is similar to SPU 705 and local store 770 is similar to local store 710 that are shown in FIG. 7A. Private store 775 is accessible by SPU 760 whereas non-private store 780 is accessible by SPU 760 as well as other processing units within a particular device. SPU 760 uses private store 775 for fast access to data. For example, SPU 760 may be responsible for complex computations that require SPU 760 to quickly access extensive amounts of data that is stored in memory. In this example, SPU 760 may allocate 100% of local store 770 to private store 775 in order to ensure that SPU 760 has enough local memory to access. In another example, SPU 760 may not require a large amount of local memory and therefore, may allocate 10% of local store 770 to private store 775 and allocate the remaining 90% of local store 770 to non-private store 780.

A system memory mapping region, such as local storage aliases 790, manages portions of local store 770 that are allocated to non-private storage. Local storage aliases 790 is similar to local storage aliases 745 that is shown in FIG. 7A. Local storage aliases 790 manages non-private storage for each SPU and allows other SPU's to access the non-private storage as well as a device's control processing unit.

While the computer system described in FIGS. 6, 7A, and 7B are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving an interrupt at a main processor;
   identifying, using a processor identifier included in the interrupt, which processor from a plurality of processors generated the interrupt, each of the plurality of processors external to the main processor;
   determining an application that the identified processor supports, the identified processor being the one of the plurality of external processors that generated the interrupt;
   in response to the determining, selecting a ring queue from a plurality of ring queues, wherein the selected ring queue is assigned to the application corresponding to the identified processor that generated the interrupt; and
   storing the interrupt in the selected ring queue.

2. The method of claim 1 further comprising:
   processing the interrupt using the application.

3. The method of claim 1 wherein the receiving, the identifying, the determining, the selecting, and the storing are performed when the application is inactive.

4. The method of claim 1 further comprising:
   identifying a next available slot in the ring queue; and
   using the next available slot in the storing.

5. The method of claim 1 further comprising:
   determining whether to process the interrupt using an operating system kernel;
   processing the interrupt using the operating system kernel in response to determining to process the interrupt using the operating system kernel; and
   performing the storing in response to determining to not process the interrupt using the operating system kernel.

6. The method of claim 1 wherein the interrupt includes one or more interrupt fields, and wherein at least one of the interrupt fields is selected from the group consisting of an event type and event data.

7. The method of claim 1 wherein the main processor and the plurality of processors are heterogeneous.

8. A program product comprising:
  computer operable medium having computer program code, the computer program code being effective to:
    receive an interrupt at a main processor;
    identify, using a processor identifier included in the interrupt, which processor from a plurality of processors generated the interrupt, each of the plurality of processors external to the main processor;
    determine an application that the identified processor supports, the identified processor being the one of the plurality of external processors that generated the interrupt;
    in response to the determining, select a ring queue from a plurality of ring queues, wherein the selected ring queue is assigned to the application corresponding to the identified processor that generated the interrupt; and
    store the interrupt in the selected ring queue.

9. The program product of claim 8 wherein the computer program code is further effective to:
  process the interrupt using the application.

10. The program product of claim 8 wherein the receiving, the identifying, the determining, the selecting, and the storing are performed when the application is inactive.

11. The program product of claim 8 wherein the computer program code is further effective to:
  identify a next available slot in the ring queue; and
  use the next available slot in the storing.

12. The program product of claim 8 wherein the computer program code is further effective to:
  determine whether to process the interrupt using an operating system kernel;
  process the interrupt using the operating system kernel in response to determining to process the interrupt using the operating system kernel; and
  perform the storing in response to determining to not process the interrupt using the operating system kernel.

13. The program product of claim 8 wherein the interrupt includes one or more interrupt fields, and wherein at least one of the interrupt fields is selected from the group consisting of an event type and event data.

14. The program product of claim 8 wherein the main processor and the plurality of processors are heterogeneous.

15. An information handling system comprising:
  a display;
  a main processor;
  a plurality of support processors;
  a shared memory accessible by the main processor and the plurality of support processors; and
  an interrupt management tool for managing interrupts, the interrupt management tool comprising software code effective to:
    receive an interrupt at a main processor;
    identify, using a processor identifier included in the interrupt, which processor from a plurality of processors generated the interrupt, each of the plurality of processors external to the main processor;
    determine an application that the identified processor supports, the identified processor being the one of the plurality of external processors that generated the interrupt;
    in response to the determining, select a ring queue from a plurality of ring queues, wherein the selected ring queue is assigned to the application corresponding to the identified processor that generated the interrupt; and
    store the interrupt in the selected ring queue.

16. The information handling system of claim 15 wherein the application is located in the main processor, the software code further effective to:
  process the interrupt using the application.

17. The information handling system of claim 15 wherein the computer program code is further effective to:
  identify a next available slot in the ring queue; and
  use the next available slot in the storing.

18. The information handling system of claim 15 wherein the computer program code is further effective to:
  determine whether to process the interrupt using an operating system kernel;
  process the interrupt using the operating system kernel in response to determining to process the interrupt using the operating system kernel; and
  perform the storing in response to determining to not process the interrupt using the operating system kernel.

19. The information handling system of claim 15 wherein the interrupt includes one or more interrupt fields, and wherein at least one of the interrupt fields is selected from the group consisting of an event type and event data.

20. The information handling system of claim 15 wherein the main processor and the plurality of support processors are heterogeneous.

\* \* \* \* \*